United States Patent
Jakob

(10) Patent No.: US 7,503,380 B2
(45) Date of Patent: Mar. 17, 2009

(54) INDUSTRIAL TRUCK WITH A RADIATOR AND A FILTER

(75) Inventor: Bernhard Jakob, Großostheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 138 days.

(21) Appl. No.: 10/712,974

(22) Filed: Nov. 13, 2003

(65) Prior Publication Data

US 2005/0051308 A1 Mar. 10, 2005

(30) Foreign Application Priority Data

Nov. 14, 2002 (DE) .................. 102 52 933

(51) Int. Cl.
*B60H 1/00* (2006.01)
(52) U.S. Cl. .................. 165/41; 180/68.1; 180/68.6
(58) Field of Classification Search .................. 165/41, 165/42, 43, 44, 72, 94, 95; 180/68.1, 68.2, 180/68.3, 68.4, 68.6
See application file for complete search history.

(56) References Cited

U.S. PATENT DOCUMENTS

| | | | | |
|---|---|---|---|---|
| 3,155,473 A * | 11/1964 | McNeil | ..................... | 55/294 |
| 3,487,623 A * | 1/1970 | Easter | ..................... | 165/122 |
| 3,837,149 A * | 9/1974 | West et al. | ..................... | 180/68.1 |
| 4,057,105 A * | 11/1977 | Bailey | ..................... | 165/41 |
| 4,153,436 A * | 5/1979 | Cozine et al. | ..................... | 55/290 |
| 4,439,218 A * | 3/1984 | Priepke et al. | ..................... | 55/288 |
| 4,542,785 A * | 9/1985 | Bagnall et al. | ..................... | 165/95 |
| 4,939,218 A * | 7/1990 | Kawaki et al. | ..................... | 351/159 |
| 5,466,189 A * | 11/1995 | Deutsch et al. | ..................... | 55/290 |
| 5,507,851 A * | 4/1996 | Kennington | ..................... | 96/426 |
| 5,944,603 A * | 8/1999 | Guinn et al. | ..................... | 55/385.3 |
| 6,248,145 B1 * | 6/2001 | Radke | ..................... | 55/295 |
| 6,432,152 B2 * | 8/2002 | Frerich | ..................... | 55/295 |
| 6,514,303 B2 * | 2/2003 | Lukac et al. | ..................... | 180/68.6 |
| 6,616,411 B2 * | 9/2003 | Sheidler et al. | ..................... | 165/71 |

* cited by examiner

*Primary Examiner*—Ljiljana (Lil) V Ciric
(74) *Attorney, Agent, or Firm*—The Webb Law Firm

(57) ABSTRACT

An industrial truck includes a radiator (3), a cooling air line (4), and a filter (6) that is located in the vicinity of the cooling air line (4). A cleaning device that can be effectively connected with the filter (6) can be integrated into the cooling air line (4). The cleaning device has a wiper (9) that can be moved along the outside surface of the screen (6) and is equipped so that it can be engaged with a drive device and can be fastened to a lever arm in the form of a parallel arm (10).

6 Claims, 5 Drawing Sheets

INDUSTRIAL TRUCK WITH A RADIATOR AND A FILTER

CROSS REFERENCE TO RELATED APPLICATION

This application corresponds to German Application No. 102 52 933.7 filed Nov. 14, 2002, which is herein incorporated by reference in its entirety.

BACKGROUND OF THE INVENTION

1. Field of the Invention

This invention relates to an industrial truck with a radiator, a cooling air line, and a filter located in the vicinity of the cooling air line.

2. Technical Considerations

For certain industrial sectors in which industrial trucks (e.g., fork-lift trucks) are used, such as the pulp and paper industry, a special piece of equipment conventionally called a "lint screen" is installed in the cooling air line in front of the radiator of the internal combustion engine drive system. To maintain the cooling capacity of the heat exchanger, this filter or "lint screen" must be cleaned at regular intervals. Therefore, the lint screen is fastened in the cooling air line so that it can be removed. This requires a correspondingly adapted construction of the box-shaped cooling air line and the nearby components (e.g., baffle plates) that are connected to it. These adaptations add a significant amount of time, money, and effort to the process of manufacturing the fork-lift truck. A large number of components of different sizes must be kept available so that components that fit the particular requirements of different types of industrial trucks will always be ready.

Therefore, it is an object of the present invention to provide an industrial truck of the general type described above but in which the lint screen (filter) can be cleaned easily and which requires relatively little excess effort and cost in terms of manufacturing an industrial truck.

SUMMARY OF THE INVENTION

The invention provides a cleaning device that can be effectively connected with the filter (e.g., lint screen) and can be integrated into the cooling air line of the industrial truck.

To clean the filter, it is no longer necessary to remove the filter (lint screen) from the cooling air line. Instead, the filter can be installed in a fixed manner in the cooling air line. This arrangement significantly simplifies the manufacturing process because the components that are adjacent to the cooling air line can be realized in the form of standard parts. The only adaptation that needs to be done can be accomplished by a different configuration of the cooling air line.

In one advantageous development of the invention, the cleaning device has a wiper that can be moved along a surface, e.g., the outside surface, of the lint screen. The wiper can be fastened to a lever arm that is equipped so that it can be engaged with drive means. This construction is simple and operationally reliable.

The drive means can be located outside the cooling air line. Theoretically, it is also possible to locate the drive means inside the cooling air line, for example, when the drive is in the form of an electric motor, as long as sufficient space is available and the drive means does not interfere with the transport of cooling air.

In one realization of the invention, the wiper can be a brush. Alternatively, a scraper can also be used. Adhering particles, e.g., lint or other material, are removed from the filter to a sufficient degree by the wiping movement of the wiper to allow sufficient cooling air flow through the filter.

It has been found to be advantageous if the lever arm is realized in the form of a parallel arm. This configuration promotes a uniform wiping movement of the wiper on the filter.

The lever arm can be advantageously connected with a hand lever that can be actuated from outside the cooling air line. The wiper can thereby be operated manually, which minimizes the complexity of the overall system. As mentioned above, other drive means can of course also be used.

If the cooling air line is provided with a connecting device for a vacuum cleaner, the lint that is wiped off the filter can be removed from the box-shaped cooling air line very easily.

A tube connected with the connecting device can have at least one opening located underneath the filter. When the vacuum cleaner is then connected and turned on, the particles of lint wiped off the filter are transported through the tube to the connection opening and, thus, into the vacuum cleaner.

BRIEF DESCRIPTION OF THE DRAWINGS

Additional advantages and features of the invention are described in greater detail below with reference to the exemplary embodiments illustrated in the accompanying schematic figures in which like reference symbols identify like parts throughout.

DESCRIPTION OF THE PREFERRED EMBODIMENTS

Figure 1:
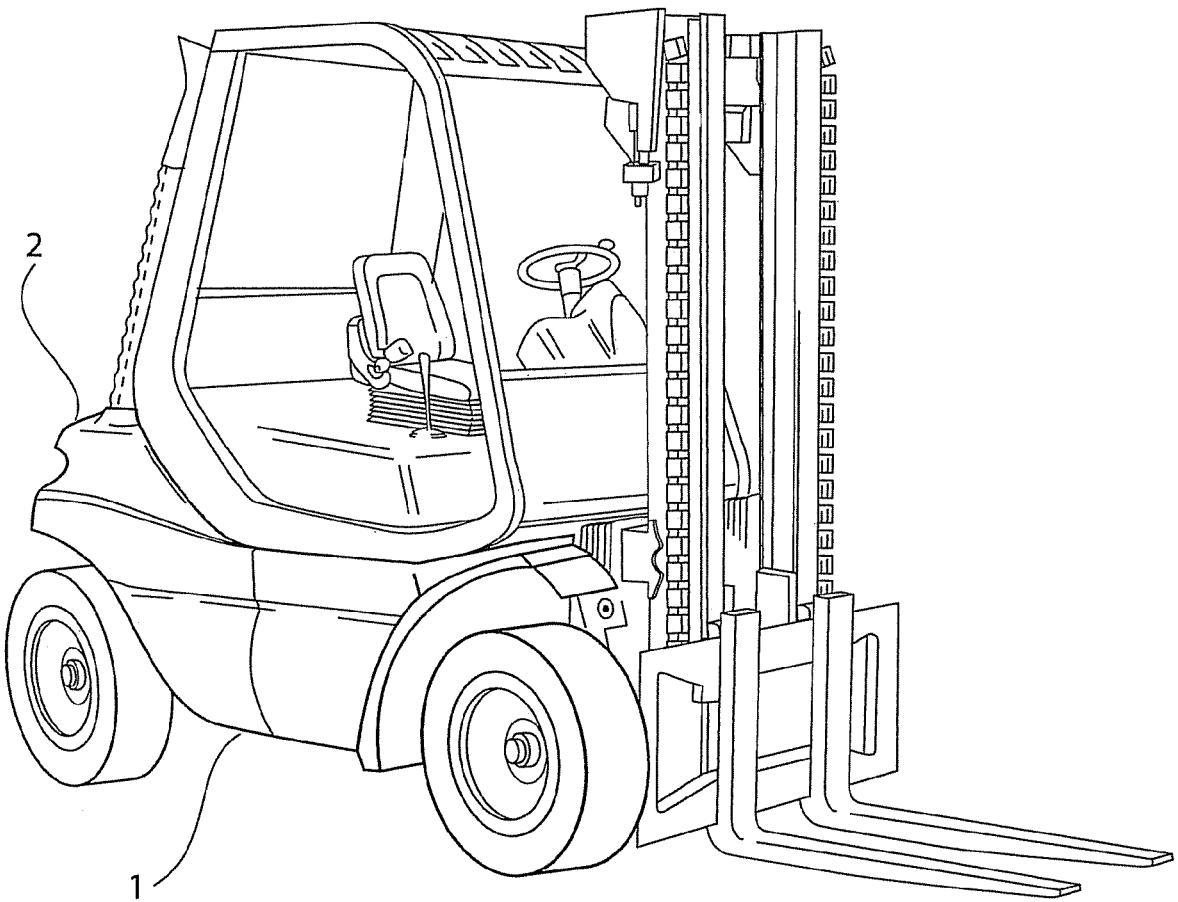
FIG. 1 is a perspective view of an industrial truck incorporating features of the invention.

In the exemplary embodiment described herein, an industrial truck incorporating features of the invention (and illustrated in FIG. 1) is realized in the form of a fork-lift truck powered by an internal combustion engine. Inside a truck body 1 are, among other things, an internal combustion engine and a cooling system (not shown). Cooling air enters the truck body 1 through various openings and, after absorbing heat, exits the truck body 1 at the rear of the vehicle through a counterweight 2 located on the rear of the vehicle.

Figure 2A:
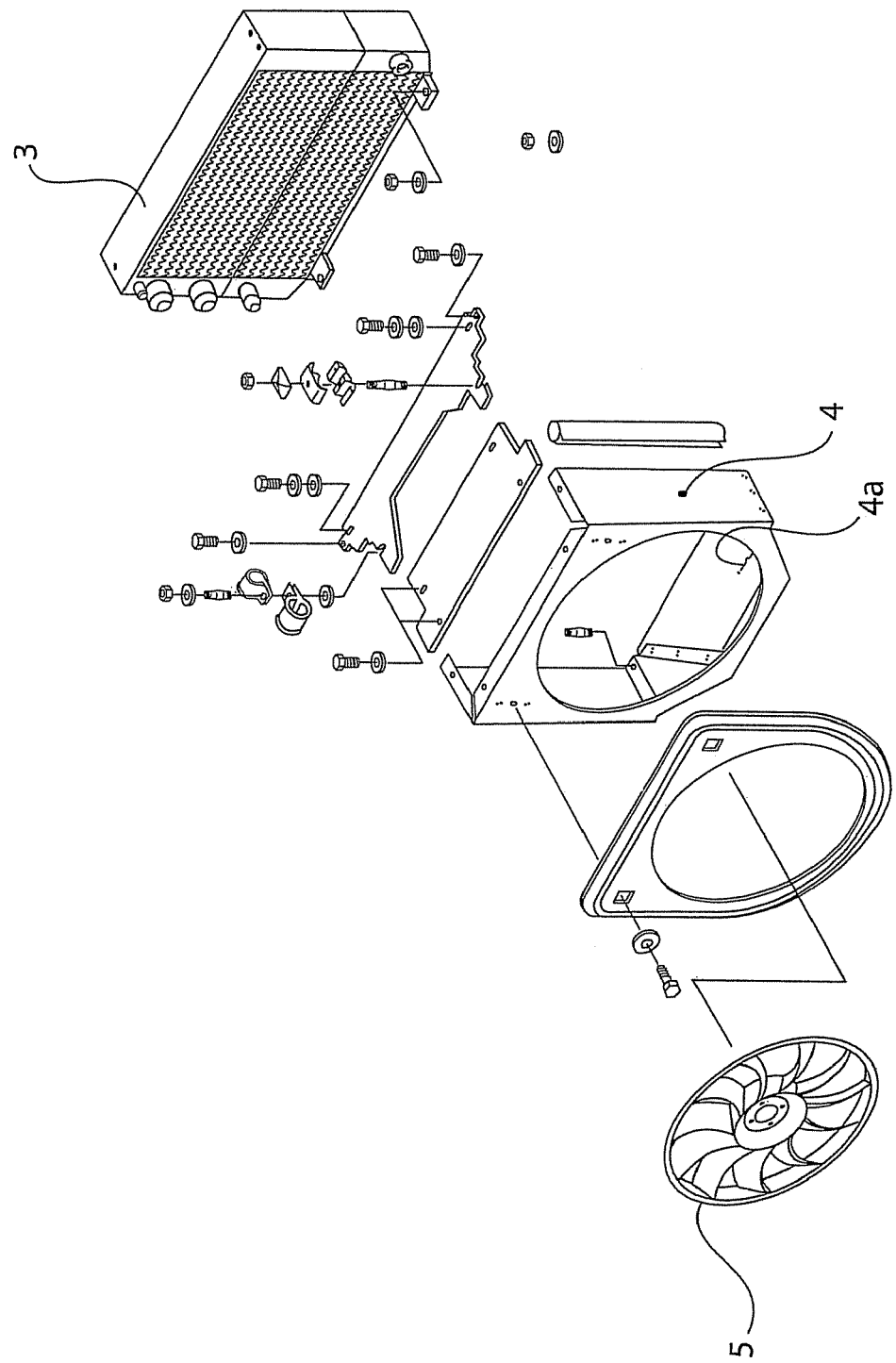
FIG. 2a is an exploded view of a radiator and a cooling air line of an industrial truck of the prior art.

Several components of a conventional cooling system of the type used in fork-lift trucks of the prior art are illustrated in FIG. 2a. Fastened to a radiator 3 (heat exchanger) is a box-shaped cooling air line 4. The cooling action can be increased by a fan wheel 5 located in a circular inlet opening 4a of the cooling air line 4 and can be driven in a manner not shown in the figure. When the fan wheel 5 is turned on, the air flow through the cooling air line 4 and the radiator 3 is increased significantly. The connected components typically located in the vicinity of the cooling air line 4 are not shown in the drawing.

Figure 2C:
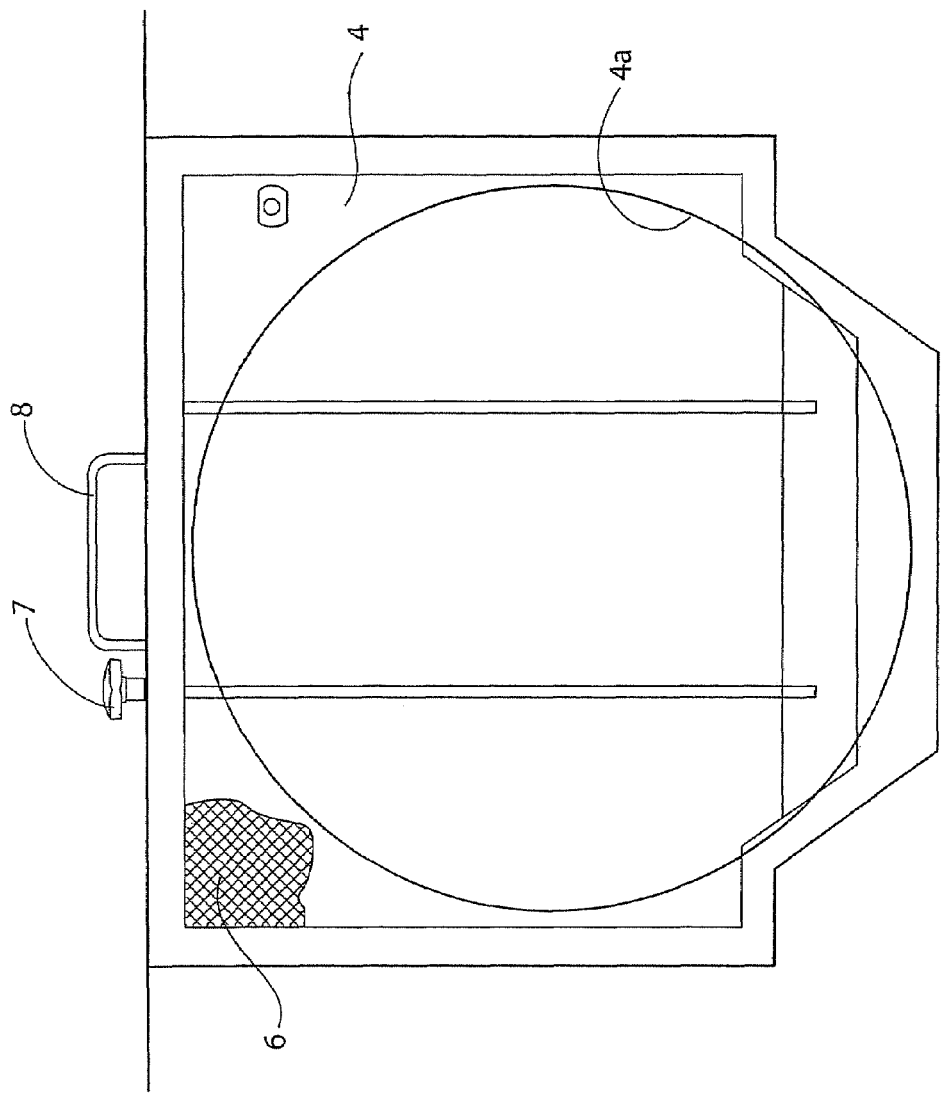
FIG. 2c is a side view of the cooling air line illustrated in FIG. 2b.
Figure 2B:
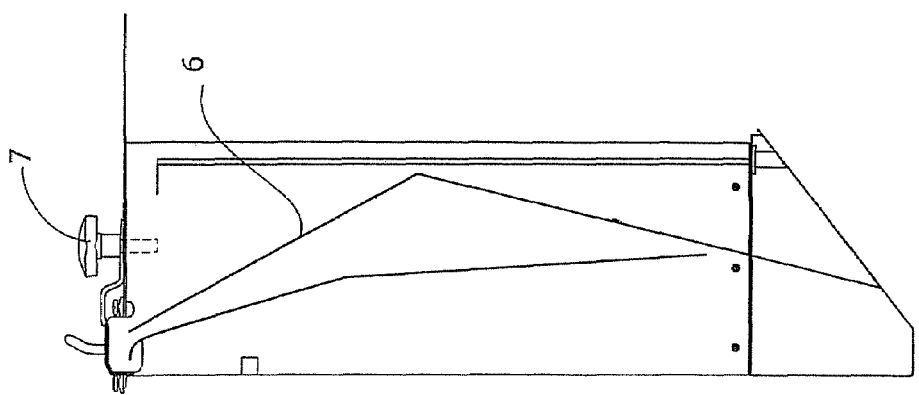
FIG. 2b is a section through a cooling air line of the prior art with a filter.

For some industries in which industrial trucks are used, such as in the paper industry, particles (lint) may be suspended in the ambient air and, after some time, can clog up the cooling plates of the radiator 3 and, thus, reduce its cooling capacity. The cooling air line 4 is, therefore, provided with a filter or screen 6 (as illustrated in FIGS. 2b and 2c), which must be regularly removed and cleaned. To remove the screen 6, a fastening screw 7 is loosened, whereupon the screen 6 can be pulled up and out of the cooling air line 4 by means of a handle 8.

Figure 3:
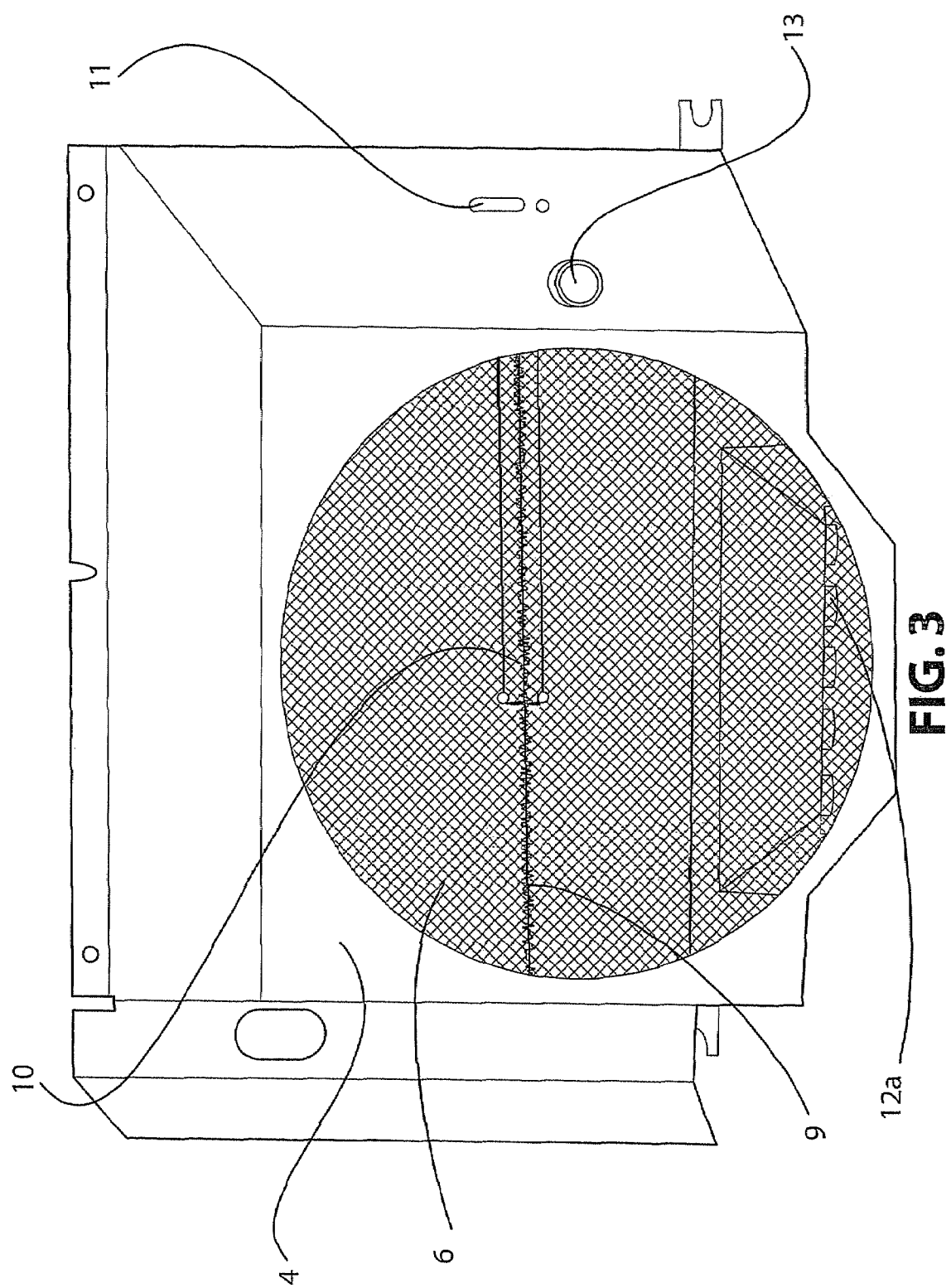
FIG. 3 is a perspective view of a cooling air line of an industrial truck of the invention, seen from the intake direction.
Figure 4:
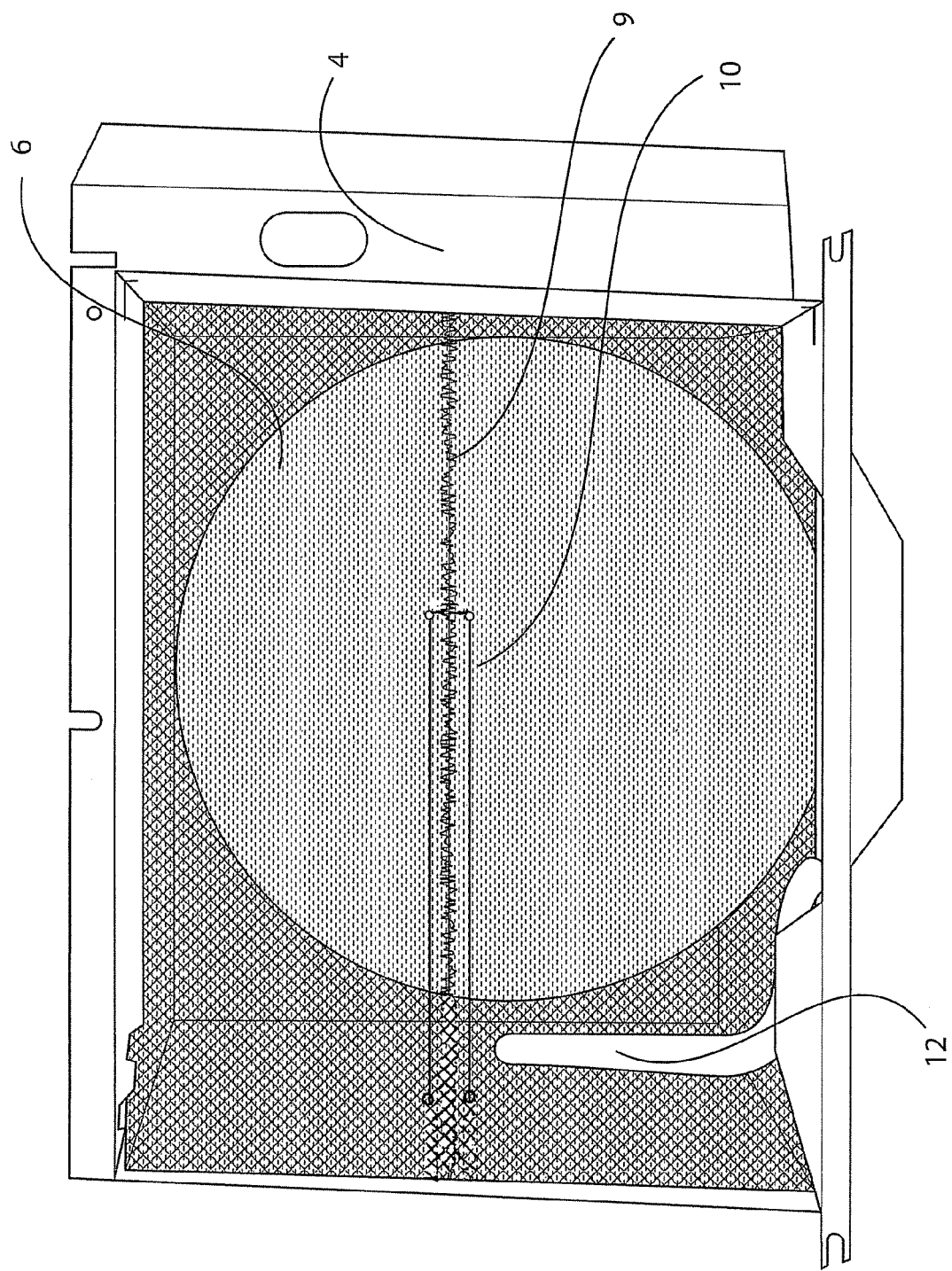
FIG. 4 is a perspective view of the cooling air line illustrated in FIG. 3, viewed from the radiator side.

FIGS. 3 and 4 show a cooling air line 4 incorporating features of the invention in which a cleaning device is integrated. The permanently installed filter, e.g., a flat screen 6, can be located on the side of the cooling air line 4 facing the radiator. A wiper 9 can be moved back and forth over the outside surface of the flat screen 6. The wiper can be fastened to a lever arm 10 realized in the form of a parallel arm, e.g., a straight arm, and, in the present exemplary embodiment, can be moved vertically up and down over the face of the screen 6. By "permanently installed" or "non-removably installed" is meant that the screen 6 is not required to be removed for cleaning.

The lever arm 10 can be connected with a hand lever 11 (drive means) located outside the cooling air line 4. The lever 11 can be used to actuate the wiper 9 manually. The lint wiped off the filter or screen 6 falls downwardly, where there is a tube 12 provided with a plurality of openings 12a and leads to a pipe-shaped connection device 13 for an industrial vacuum cleaner. The lint wiped off the filter 6 can, therefore, be removed from the cooling air line 4 by suction without having to remove any equipment or disassemble the cooling air line 4.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
   a radiator;
   a cooling air line;
   a filter device located in the flow path of the cooling air line, the filter device including a stationary screen non-removably integrated into the cooling air line;
   a cleaning device effectively connected with the screen the cleaning device including a single wiper movable up and down along an outside surface of the screen, a lever arm fastened to the wiper and connected with a hand lever located outside the cooling air line such that the lever arm is manually actuated from outside the cooling air line; and
   a tube connected to a suction device and having a plurality of inlet openings, wherein the tube is located underneath the screen.

2. The industrial truck as claimed in claim 1, wherein the wiper comprises a brush.

3. The industrial truck as claimed in claim 1, wherein the lever arm is a parallel arm.

4. The industrial truck as claimed in claim 1, wherein the single wiper is movable up and down in a substantially vertical path along an outside surface of the screen.

5. An industrial truck, comprising:
   a radiator;
   a cooling air line;
   a stationary filter screen non-removably installed in the cooling air line;
   a cleaning device operatively connected to the filter screen, the cleaning device comprising a wiper comprising a brush configured to contact a surface of the filter screen to remove material from the filter screen while the filter screen is inside the cooling air line, a lever arm connected to the wiper and to a hand lever located outside the cooling air line such that the lever arm is manually actuated from outside of the cooling air line, wherein the lever arm is a parallel arm; and
   a tube having a plurality of inlet openings and positioned under the filter screen and in flow communication with a suction device.

6. The industrial truck as claimed in claim 5, wherein the lever arm moves the wiper in a substantially vertical path along the surface of the filter screen.

\* \* \* \* \*